I. ANDERSSON.
DEPTH OR LIQUID LEVEL GAGE.
APPLICATION FILED AUG. 4, 1919.

1,361,576.

Patented Dec. 7, 1920.

WITNESSES.

INVENTOR.

UNITED STATES PATENT OFFICE.

IVAN ANDERSSON, OF EAST ELMHURST, NEW YORK, ASSIGNOR TO ANDERSSON GASOMETER CO. INC., OF NEW YORK, N. Y., A CORPORATION OF NEW YORK.

DEPTH OR LIQUID-LEVEL GAGE.

1,361,576. Specification of Letters Patent. Patented Dec. 7, 1920.

Application filed August 4, 1919. Serial No. 315,104.

*To all whom it may concern:*

Be it known that I, IVAN ANDERSSON, a subject of the King of Sweden, residing at East Elmhurst, in the county of Queens and State of New York, have invented a new and useful Depth or Liquid-Level Gage, of which the following is a specification.

The present invention refers to a depth or liquid level gage and has for its object to provide reliable means for ascertaining the depth or the level of a liquid at a distance away from the supply. Although this invention is mainly conceived for indicating the liquid fuel supply on motor driven vehicles or vessels, it may equally well be used to indicate the depth or level of any liquid supply.

It consists of two airtight chambers separated by a diaphragm or any suitable elastic member, and filled with liquid, the one chamber being connected by a tube or the like to the liquid supply which is of a varying level, and the other chamber being connected to a column of the same liquid but of constant level and the liquid supply and the constant level column being mounted substantially in vertical center alinement with respect to each other.

In this way the resultant of the pressures on the diaphragm will be about constant at any inclination of the system within reasonable limits, except when the level of the liquid supply varies, which will change the resultant of the pressures on the diaphragm and cause the same to move. By connecting the diaphragm to an indicating mechanism located in one of the chambers and providing same with an indicating hand and dial, and by making the wall in front of the same transparent, the depth or level of the liquid supply can be read at any time.

The invention is illustrated in the accompanying drawing where—

Figure 1:
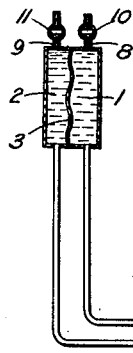
Figure 1:
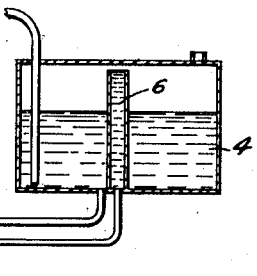

Figure 1 is a diagrammatic view of the principle, and

Figure 2:
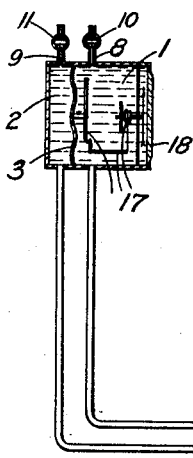
Figure 2:
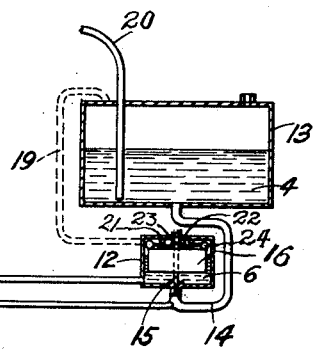

Fig. 2 a diagrammatic view of a practical application.

In Fig. 1, 1 and 2 are two airtight chambers separated by the diaphragm 3. The chamber 1 is connected to the liquid supply 4 by the tube 5, and the chamber 2 is connected to the liquid column 6 of constant level by the tube 7. To enable the chambers to be filled with liquid the air is extracted from the chambers through the outlets 8 and 9 which are then closed by suitable means, here diagrammatically shown as stop cocks 10 and 11. The constant level of the liquid in the constant level chamber, illustrated in Fig. 1, is maintained by filling the tank when the liquid overflows and fills the constant level chamber.

In the practical example shown in Fig. 2, the constant level column 6 is contained in a float chamber 12 which is preferably placed under the tank 13 containing the supply liquid 4. Means are provided for automatically maintaining the liquid level in the chamber 12 at a constant level.

Means of any preferred construction may be provided for attaining this end; a conventional form of such mechanism being shown in Fig. 2 of the drawing wherein a float 16 within the chamber 12 rises and falls according to the quantity of liquid within the chamber. The float surrounds a valve stem 15 which controls the flow of the liquid into the chamber through pipe 14 from tank 13. The top wall of the chamber has depending therefrom brackets 21, to which the intermediate portions of levers 22 are pivoted. The inner ends of these levers engage beneath a shoulder 23 on the upper part of the valve stem, while the outer ends of the levers are weighted as at 24 and rest upon the upper surface of the float 16. It is obvious, therefore, that when the chamber is filled, the inner ends of the levers will be caused to move down, permitting the valve stem to gravitate to shut off the liquid supply. When the float moves downwardly, due to the low level of liquid in the chamber, the inner ends of the levers will be caused to move upwardly, engaging the shoulder on the valve stem and lifting it from its seat in feed pipe 14 to allow the entrance of liquid to maintain a constant level. The float chamber is connected by tube 7 to chamber 1 which is filled with the liquid, the air having been withdrawn as before described. This chamber contains the indicating mechanism 17 which works in the liquid, and is also provided with a transparent wall or glass 18. The chamber 2 is connected to the tank 13 and filled with the liquid.

In the case where the supply liquid is being fed by air pressure the float chamber is made airtight and connected to the air pressure by a tube 19 as indicated in dotted lines. 20 indicates a feed pipe.

It will be noted that in both forms, the center of the constant level column or chamber is in vertical alinement with the center of the supply tank and that consequently both bodies of liquids will partake of oscillations to the same degree so that the resultant pressures on the diaphragm is uneffected by the inclination of the motor vehicle or vessel on which it may be placed.

I claim as my invention:

1. Apparatus for indicating, regardless of its inclination from the horizontal, the depth or level of a liquid supply, including two airtight chambers separated by an elastic wall and filled with liquid, a supply chamber containing liquid of varying level and connected with one of the airtight chambers, an auxiliary chamber containing liquid of constant level and connected with the other airtight chamber, said supply and auxiliary chambers mounted substantially in vertical center alinement with respect to each other.

2. Apparatus for indicating, regardless of its inclination from the horizontal, the depth or level of a liquid supply, including: two airtight chambers separated by an elastic wall and filled with liquid, a supply chamber containing liquid of varying level and connected with one of the airtight chambers, an auxiliary chamber containing liquid of constant level and connected with the other airtight chamber, said supply and auxiliary chambers mounted substantially in vertical center alinement with respect to each other, and means for automatically replenishing the liquid in the constant level chamber from the supply chamber.

IVAN ANDERSSON.

Witnesses:
ALEX FORSTENE,
CHAS. ABRAHAMS.